No. 756,213. PATENTED APR. 5, 1904.
S. A. CONNELL, Sr.
SURGICAL KNIFE.
APPLICATION FILED SEPT. 8, 1903.
NO MODEL.
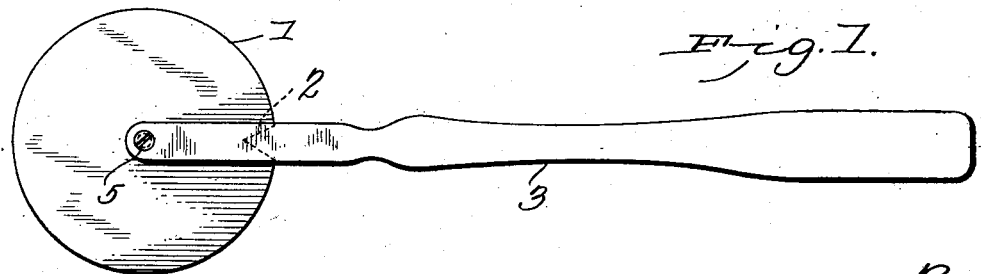
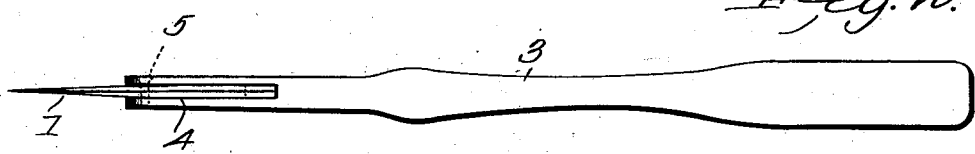
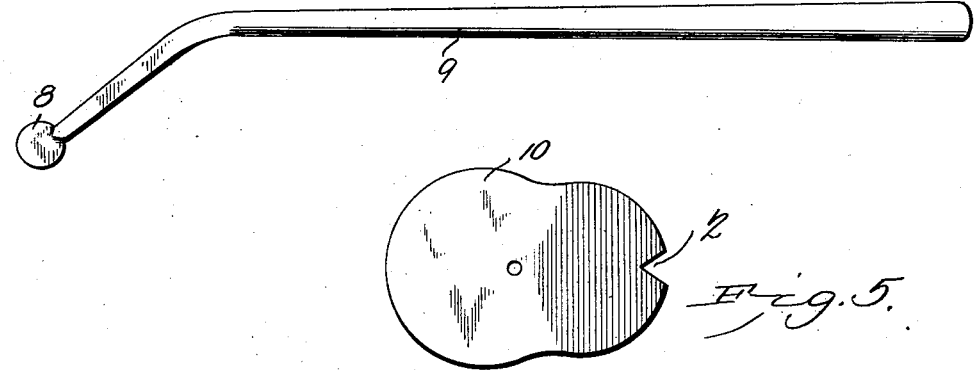
Witnesses
E. F. Stewart
Baxter Morton
S. A. Connell, Sr.,
Inventor.
by C. A. Snow & Co.
Attorneys No. 756,213. Patented April 5, 1904.

UNITED STATES PATENT OFFICE.

SMITH A. CONNELL, SR., OF EAST LAS VEGAS, TERRITORY OF NEW MEXICO, ASSIGNOR OF ONE-HALF TO SMITH A. CONNELL, JR., OF EAST LAS VEGAS, TERRITORY OF NEW MEXICO.

SURGICAL KNIFE.

SPECIFICATION forming part of Letters Patent No. 756,213, dated April 5, 1904.

Application filed September 8, 1903. Serial No. 172,390. (No model.)

*To all whom it may concern:*

Be it known that I, SMITH A. CONNELL, Sr., a citizen of the United States, residing at East Las Vegas, in the county of San Miguel and Territory of New Mexico, have invented a new and useful Surgical Knife, of which the following is a specification.

This invention relates to surgical knives; and the object thereof is to provide a suitable form of surgical knife which may be used for cutting in body-cavities under circumstances which render the use of a knife of any of the ordinary forms impracticable.

In the drawings accompanying this specification I have illustrated several different forms of embodiment of the invention, all designed to meet slightly-different conditions.

In the drawings, Figure 1 is a side view of one form of knife embodying my invention in which the handle and blade are separate and are provided with a special form of fastening means by which they may be secured in perfectly rigid association. Fig. 2 is an edge view of the knife shown in Fig. 1 with the blade and handle formed integral. Fig. 3 is a view of a form of the invention having an integral blade and handle and especially adapted for dental work. Fig. 4 is another form of knife having an integral blade and handle for dental use. Fig. 5 is a view of the modified form of blade for use with a separate handle.

Referring to the drawings in detail, 1 designates the separable blade of the knife illustrated in Fig. 1. The blade 1 is preferably circular, except where a notch is formed in its periphery for purposes presently to be explained. The blade 1 is thickest at the center, as shown in Fig. 2, and becomes gradually thinner toward the periphery, where it is ground to an edge of sufficient sharpness, except at the notch 2. The handle 3 is preferably formed of a single piece of metal and slotted at 4 to receive the blade. The face of the slot is adapted to conform to the V-shaped notch 2 in the periphery of the blade. The blade is secured in position on the handle by means of a screw 5 passing through a threaded opening provided therefor in the slotted end of the handle.

The knife formed as above described is readily sterilized when the blade is removed from the handle, and when the blade and handle are assembled they are held in practically rigid association, so that there is no play of the blade in the end of the handle, which would be disadvantageous in surgical work.

In the form of knife illustrated in Fig. 3 the blade 6 is smaller than the blade 1 shown in Fig. 1 and is formed integral with the handle 7, so that the knife may be readily sterilized without separating the blade and handle. The integral construction of the blade and handle is of advantage in knives of small size; but in knives having larger blades it is desirable to have the blade separable from the handle and provide a plurality of blades for use with each handle.

The form of knife illustrated in Fig. 4 is substantially similar to that shown in Fig. 3, having a blade 8 of precisely similar form, but having a handle 9, which is bent to facilitate the use of the implement in operating within the mouth, for which work it is desirable that the handle be so constructed that when in use the hand of the operator of the knife will not obstruct his view of the mouth-cavity.

The blade 10 illustrated in Fig. 5 may be used, if desired, in place of the blade 1 shown in Figs. 1 and 2 and is adapted for use within cavities whose depth is great in relation to their width.

It will be observed that with knives of any of the forms above described it is easy to cut forward, backward, or at either side of the cavity in which the knife is used, and that the absence of a point on the blade is of advantage in preventing accidental puncturing of blood vessels.

Having thus described the nature and construction of my invention, what I claim as new, and desire to secure by Letters Patent, is—

1. A surgical knife comprising a handle and a blade rigidly mounted in said handle and having a cutting edge which forms a continuous curve from one side of the handle to the other and is adapted to cut when pressed in any direction.

2. A surgical knife comprising a handle and a blade rigidly and detachably mounted in said handle, said blade having a cutting edge which is formed in a continuous curve and is adapted to cut when pressed in any direction.

3. A surgical knife comprising a substantially circular blade having a notch in the periphery thereof, a separable handle having a slot to receive said blade and a projection to engage said notch, and means for securing said blade in said slot.

4. A surgical knife comprising a substantially circular blade having a notch in the periphery and an opening in the center, a handle having a slotted end for the reception of said blade, a projection at the base of the slot to engage said notch, and a screw mounted in the slotted end of the handle and adapted to engage the opening in the blade.

In testimony that I claim the foregoing as my own I have hereto affixed my signature in the presence of two witnesses.

SMITH A. CONNELL, Sr.

Witnesses:
M. M. Griffith,
A. Whittier.